(12) United States Patent
Hwang et al.

(10) Patent No.: US 9,450,884 B2
(45) Date of Patent: Sep. 20, 2016

(54) SOFTWARE DEFINED NETWORKING BASED CONGESTION CONTROL

(71) Applicants: Jae Hyun Hwang, Anyang (KR); Thierry Klein, Fanwood, NJ (US)

(72) Inventors: Jae Hyun Hwang, Anyang (KR); Thierry Klein, Fanwood, NJ (US)

(73) Assignee: Alcatel-Lucent, Boulogne-Billancourt (FR)

(*) Notice: Subject to any disclaimer, the term of this patent is extended or adjusted under 35 U.S.C. 154(b) by 154 days.

(21) Appl. No.: 14/302,052

(22) Filed: Jun. 11, 2014

(65) Prior Publication Data

US 2015/0365325 A1 Dec. 17, 2015

(51) Int. Cl.
*H04L 1/00* (2006.01)
*H04L 12/911* (2013.01)
*H04L 12/801* (2013.01)

(52) U.S. Cl.
CPC .............. *H04L 47/70* (2013.01); *H04L 47/12* (2013.01)

(58) Field of Classification Search
CPC ... H04L 12/801; H04L 12/911; H04L 47/12; H04L 47/70
USPC ......................................................... 370/230
See application file for complete search history.

(56) References Cited

U.S. PATENT DOCUMENTS

| 6,714,555 B1* | 3/2004 | Excell | H04L 49/30 370/395.43 |
| 8,949,444 B1* | 2/2015 | Ma | H04L 65/105 709/228 |
| 2012/0195192 A1* | 8/2012 | Matthews | H04L 47/30 370/230 |

OTHER PUBLICATIONS

Alizadeh, M. et al., "Data Center TCP (DCTCP)", SIGCOM'10, 2010, pp. 1-12, New Delhi, India.
Benson, T. et al, "Network Traffic Characteristics of Data Centers in the Wild", IMC'10, 2010, Melbourne, Australia, pp. 1-14.
Hwang, J. et al. "IA-TCP: A Rate Based Incast-Avoidance Algorithm for TCP in Data Center Networks", IEEE ICC 2012—Communication QOS, Reliability and Modeling Symposium, 2012, pp. 1292-1296.
Wilson, C. et al. "Better Never Than Late: Meeting Deadlines in Datacenter Networks", SIGCOMM'11, 2011, pp. 50-61, Toronto, Ontario, Canada.

\* cited by examiner

*Primary Examiner* — Sai-Ming Chan
(74) *Attorney, Agent, or Firm* — Harness, Dickey & Pierce, P.L.C.

(57) ABSTRACT

Methods and systems of adjusting bandwidth allocation by a network element in a communications network includes monitoring a data flow traversing a target port, determining a bandwidth allocation for the target port, determining a fair-share bandwidth allocation for the target port, and adjusting the bandwidth allocation for the target port based on the fair-share bandwidth allocation. The bandwidth allocation for the target port is a bandwidth that is currently allocated for the data flow. The fair-share bandwidth allocation is a proportional allocation of a total bandwidth of the network element.

20 Claims, 7 Drawing Sheets

SOFTWARE DEFINED NETWORKING BASED CONGESTION CONTROL

BACKGROUND

Data centers are facilities that contain computing and storage resources for enabling online services, such as website hosting, cloud computing, cloud storage, telecommunications, and the like. Currently, many online service providers are aggressively building their own data centers in order to provide one or more online services. In the meantime, many hardware manufacturers are also developing cost-effective and high-performance data center switches to meet the service demands of the data centers.

In addition, Software Defined Networking (SDN) enabled switches have emerged as an important building block in managing the data centers. SDN is an approach to computer networking that allows network administrators to manage network services by decoupling network control functions from data forwarding functions. This allows network administrators to define the network control functions and to define an abstraction of the underlying network infrastructure for desired applications and desired network services.

However, most data center switches do not address network congestion, which may result in packet losses and may affect a quality of service (QoS) of some data flows. In data centers, packet loss mainly occurs due to momentary data bursts rather than high link utilization. Packet loss due to data bursts can be explained by the bursty nature of traffic in data center networks. Because packet loss can be attributed to data bursts instead of high link utilization, increasing switch capacity may not provide a solution for addressing network congestion in data centers. Some switch-side solutions utilize Explicit Congestion Notification (ECN) functionality, but such solutions may not be scalable in terms of the number of concurrent data flows. For example, Data Center TCP (DCTCP), which controls a server's sending rate by exploiting the ECN, can endure up to thirty five (35) connections without suffering any packet loss. However, most data centers may have a number of concurrent flows that frequently exceeds thirty five (35) flows per server.

SUMMARY

At least one example embodiment relates to a method for adjusting bandwidth allocation by a network element in a communications network.

According to an example embodiment, a method for adjusting bandwidth allocation by a network element in a communications network is provided. The network element includes a target port. The method includes monitoring a data flow traversing the target port. The method includes determining a bandwidth allocation for the target port. The bandwidth allocation for the target port is a bandwidth that is currently allocated for the data flow. The method includes determining a fair-share bandwidth allocation for the target port. The fair-share bandwidth allocation is a proportional allocation of a total bandwidth of the network element. The method includes adjusting the bandwidth allocation for the target port based on the fair-share bandwidth allocation.

Example embodiments provide that the network element includes a plurality of ports, the plurality of ports includes the target port, and each of the plurality of ports is assigned a corresponding bandwidth allocation. Example embodiments provide that the determining the fair-share bandwidth allocation includes determining a weight value for each of the plurality of ports; determining a total weight value based on the weight value of each of the plurality of ports; and determining the fair-share bandwidth allocation based on the weight value of the target port and the total weight value.

Example embodiments provide that the monitoring includes receiving a data packet associated with the data flow; determining whether the received data packet is one of a flow termination packet and a flow initiation packet; increasing the total weight value by the weight of the target port if the received data packet is a flow initiation packet; and decreasing the total weight value by the weight of the target port if the received data packet is a flow termination packet.

Example embodiments provide that the determining the bandwidth allocation for the target port includes determining a link capacity for the target port, where the link capacity is a highest amount of bandwidth that may be allocated to the target port; determining a round trip time (RTT) associated with the data flow; and determining the bandwidth allocation for the target port by multiplying the link capacity by the RTT.

Example embodiments provide that the determining the fair-share bandwidth allocation further includes determining a fair-share weight value by dividing the weight value of the target port by the total weight value; and determining a weighted fair-share bandwidth allocation by multiplying the fair-share weight value by the bandwidth allocation for the target port.

Example embodiments provide that the monitoring includes defining a time out value for a timer, the timer being associated with the bandwidth allocation for the target port; and determining that a timeout event has occurred with respect to the data flow based on expiration of the timer.

Example embodiments provide that the monitoring further includes receiving a data packet associated with the data flow; resetting the timer to be equal to the timeout value if the timeout event does not occur before the data packet is received; and decreasing the total weight by the weight of the target port if the timeout event does occur before the data packet is received.

Example embodiments provide that the monitoring further includes increasing the total weight by the weight of the target port when a subsequent data packet is received after the timeout event occurs.

Example embodiments provide that the monitoring further includes determining a timeout fraction based on a number of times that the total weight is increased by the weight of the target port when the subsequent data packet is received after the timeout event occurs; determining a target fraction based on the timeout fraction; and adjusting the timeout value based on the target fraction.

Example embodiments provide that the time out value is based on a desired minimum timeout value and a desired maximum timeout value, and the desired minimum timeout value is larger than a RTT associated with the data flow.

At least one example embodiment relates to a method of adjusting bandwidth allocation by a network controller in a communications network.

According to an example embodiment, a method of adjusting bandwidth allocation by a network controller in a communications network, where the network controller is configured to control a network element, and the network element includes a target port. The method includes receiving data flow information from the network element. The data flow information includes information about data flows traversing the target port. The method includes determining a bandwidth allocation of the target port based on the data flow information. The bandwidth allocation of the target port is a bandwidth that is currently allocated for each of the data flows traversing the target port. The method includes determining an over-subscription ratio. The over-subscription ratio is a ratio of the bandwidth allocation of the target port to a number of data flows traversing the target port. The method includes transmitting the over-subscription ratio to the network element based on the over-subscription ratio and a threshold value. The method includes determining a fair-share bandwidth allocation for the target port based on the over-subscription ratio and the threshold value. The fair-share bandwidth allocation is a proportional allocation of a total bandwidth of the network element. The method includes adjusting the bandwidth allocation for the target port based on the fair-share bandwidth allocation.

Example embodiments provide that the network element includes a plurality of ports, the plurality of ports includes the target port, and each of the plurality of ports is assigned a corresponding bandwidth allocation. Example embodiments provide that the determining the fair-share bandwidth allocation for the target port includes determining the bandwidth allocation for each of the plurality of ports; determining a weight value for each of the plurality of ports; determining a total weight value based on the weight value for each of the plurality of ports; and determining the fair-share bandwidth allocation for the target port based on the weight value of the target port and the total weight value.

Example embodiments provide that the determining the bandwidth allocation for each of the plurality of ports includes determining a link capacity for the target port, where the link capacity is a highest amount of bandwidth that is able to be allocated to of the target port; determining a RTT for one of the data flows traversing the target port; and determining the bandwidth allocation for the target port by multiplying the link capacity by the RTT.

Example embodiments provide that the determining the fair-share bandwidth allocation for the target port includes determining a fair-share weight value by dividing the weight value of the target port by the total weight value; and determining a network fair-share bandwidth allocation by multiplying the fair-share weight value by the bandwidth allocation of the target port.

Example embodiments provide that the network element is associated with a secondary network element. The secondary network element includes a secondary set of ports, and the secondary network element determines a weighted fair-share bandwidth allocation for each of the secondary set of ports.

Example embodiments provide that the adjusting the bandwidth allocation for the target port includes determining a data flow traversing the target port and a secondary target port, where the secondary target port is one of secondary set of ports; determining the weighted fair-share bandwidth allocation for the target port and the secondary target port; determining the network fair-share bandwidth allocation for the data flow traversing the target port and the secondary target port; adjusting the bandwidth allocation for the target port based on the weighted fair-share bandwidth allocation when the weighted fair-share bandwidth allocation is less than the network fair-share bandwidth allocation; and adjusting the bandwidth allocation for the target port based on the network fair-share bandwidth allocation when the network fair-share bandwidth allocation is less than the weighted fair-share bandwidth allocation.

At least one example embodiment relates to an edge switch for adjusting bandwidth allocation in a communications network.

According to an example embodiment, an edge switch for adjusting bandwidth allocation in a communications network is provided. The edge switch includes a target port. The edge switch configured to monitor a data flow traversing the target port. The edge switch configured to determine a bandwidth allocation for the target port, the bandwidth allocation for the target port being a bandwidth that is currently allocated for the data flow. The edge switch configured to determine a fair-share bandwidth allocation for the target port, the fair-share bandwidth allocation being a proportional allocation of a total bandwidth of the network element. The edge switch configured to adjust the bandwidth allocation for the target port based on the fair-share bandwidth allocation.

Example embodiments provide that the edge switch includes a plurality of ports, the plurality of ports including the target port, and each of the plurality of ports is assigned a corresponding bandwidth allocation, and in the determining the fair-share bandwidth allocation. Example embodiments provide that the edge switch is configured to determine a weight value for each of the plurality of ports. The edge switch is configured to determine a total weight value based on the weight value of each of the plurality of ports. The edge switch is configured to determine the fair-share bandwidth allocation based on the weight value for the target port and the total weight value.

Example embodiments provide that, in the determining the bandwidth allocation for the target port, the edge switch is configured to determine a link capacity for the target port, the link capacity being a highest amount of bandwidth that is able to be allocated to the target port; determine a RTT associated with the data flow; determine the bandwidth allocation for the target port by multiplying the link capacity by the RTT; determine a fair-share weight value by dividing the weight value for the target port by the total weight value; and determine a weighted fair-share bandwidth allocation by multiplying the fair-share weight value by the bandwidth allocation for the target port.

At least one example embodiment relates to a Software Defined Networking (SDN) controller for adjusting bandwidth allocation in a communications network, where the SDN controller is configured to control a core/aggregation switch.

According to an example embodiment, a SDN controller for adjusting bandwidth allocation in a communications network is provided. The SDN controller is configured to control a core/aggregation switch, and the core/aggregation switch includes a target port. The SDN controller is configured to receive data flow information from the network element. The data flow information includes information about data flows traversing of the target port. The SDN controller is configured to determine a bandwidth allocation of the target port based on the data flow information. The bandwidth allocation of the target port is a bandwidth that is currently allocated for each of the data flows traversing the target port. The SDN controller is configured to determine an over-subscription ratio. The over-subscription ratio is a ratio of the bandwidth allocation of the target port to a number of data flows traversing the target port. The SDN controller is configured to transmit the over-subscription ratio to the aggregation switch based on the over-subscription ratio and a threshold value. The SDN controller is configured to determine a fair-share bandwidth allocation for the target port based on the over-subscription ratio and the threshold value. The fair-share bandwidth allocation is a proportional allocation of a total bandwidth of the network element. The SDN controller is configured to adjust the bandwidth allocation for the target port based on the fair-share bandwidth allocation.

BRIEF SUMMARY OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
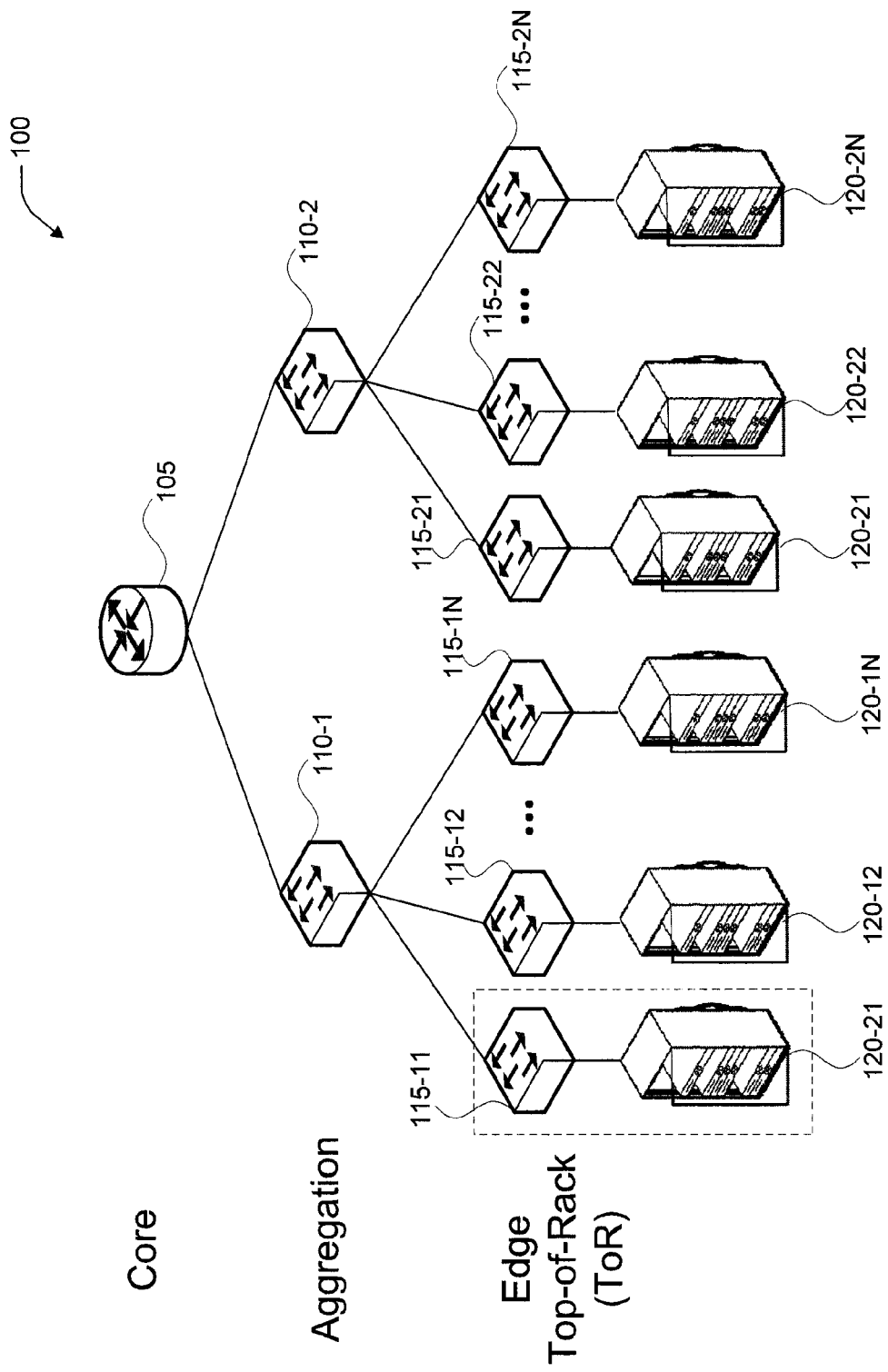
FIG. 1 illustrates an example of a data center communications network, according to an example embodiment.

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "user agent" may be considered synonymous to, and may hereafter be occasionally referred to, as a client, mobile, mobile unit, mobile station, mobile user, user equipment (UE), subscriber, user, remote station, access agent, user agent, receiver, etc., and may describe a remote user of network resources in a communications network. Furthermore, the term "user agent" may include any type of wireless/wired device such as consumer electronics devices, smart phones, tablet personal computers, personal digital assistants (PDAs), desktop computers, and laptop computers, for example.

As used herein, the term "network device", may be considered synonymous to and/or referred to as a networked computer, networking hardware, network equipment, router, switch, hub, bridge, gateway, or other like device. The term "network device" may describe a physical computing device of a wired or wireless communication network and configured to host a virtual machine. Furthermore, the term "network device" may describe equipment that provides radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes (e.g., an edge switch, aggregation switch, or core switch as shown in FIG. 1). Such existing hardware may include one or more digital signal processors (DSPs), application-specific-integrated-circuits, field programmable gate arrays (FPGAs) computers or the like.

Example embodiments provide methods and systems for Software Defined Networking (SDN)-based congestion management. The example embodiments operate on a software-based virtual switch in a hypervisor, virtual machine monitor (VMM), or other like network controller. Example embodiments allow for multiple concurrent flows per physical server, while reducing packet losses as well as requiring few specific switch capacity upgrades. The example embodiments also support quality of service (QoS)-awareness such that premium and/or high-priority data flows receive more bandwidth than non-premium and/or lower-priority data flows.

FIG. 1 illustrates an example of a data center communications network, according to an example embodiment. Communications network 100 includes core switch 105, aggregation switches 110, edge switches 115, and server stacks 120.

Edge switches 115, aggregation switches 110, and core switch 105 ("the switches") may be configured to provide communication services to user agents and/or user devices operating within a computer network (e.g., an enterprise private network, virtual private network, local area network (LAN), or other like computer network). The switches may also link network segments or other network devices within a computer network. Additionally, in some embodiments, the switches may be configured as virtual local area networks (VLAN). In such embodiments, one or more of the switches may be partitioned to create multiple distinct broadcast domains, which are logically isolated from one another while remaining on the same physical switch.

The switches may be configured to process and route data (or data packets) at the data link layer (layer 2) of the OSI model, and/or process data (or data packets) at the network layer (layer 3) (i.e., the switches may be considered "multilayer switches"). The switches may employ multiple connection interfaces in order to allow different user agents and/or user devices to connect to a communications network, including Ethernet, Fibre Channel, ATM, ITU-T, G.hn, 802.11, and/or other like connection interfaces. According to various embodiments, where the switches utilize L2/L3 connections to connect two or more devices at the datalink layer (L2) and/or the network layer (L3) of the OSI model, the L2/L3 connections may operate as an enterprise private network, virtual private network, local area network (LAN), or other like computer network.

An L2 connection may employ a protocol for providing the functional and procedural means to transfer data between network entities. Such protocols may include Ethernet, Point-to-Point Protocol (PPP), High Level Data Link Control (HDLC), or other like protocols already known in the art. An L3 connection may employ a protocol for providing the functional and procedural means of transferring variable length data sequences from a source to a destination host via one or more networks while maintaining quality of service (QoS) functions. Such protocols may include Internet Protocol version 4 (IPv4), Internet Protocol version 6 (IPv6), or other like protocols already known in the art.

According to various embodiments, the switches may utilize a WLAN connection to link two or more devices using a wireless distribution method, such as spread-spectrum, orthogonal frequency-division multiplexing (OFDM), or other like wireless distribution method. The WLAN connection may be configured to provide a connection to the Internet for various network elements (e.g., one or more user agents via edge switches 115, aggregation switches 110, and core switch 105). In various embodiments, the WLAN connection may be a Wide Area Network (WAN) or other like network that covers a broad area, such as a personal area network (PAN), local area network (LAN), campus area network (CAN), metropolitan area network (MAN), and the like.

The switches may include one or more processors, a network interface including one or more transmitters/receivers connected to one or more antennas, a computer readable medium, and (optionally) a display device. The one or more transmitters/receivers may be configured to transmit/receive data signals to/from one or more user agents.

Server stacks 120 may include one or more servers (i.e., a physical computer hardware system) that is configured to provide services for users connected to a network. The one or more servers of the server stacks 120 may employ connection-oriented protocols such as Session Initiation Protocol (SIP), HTTP, and TCP/IP, and includes servers that use connectionless protocols such as User Datagram Protocol (UDP) and Internet Packet Exchange (IPX). The one or more servers of the server stacks 120 may be configured to establish, manage, and terminate communications sessions between user agents, user devices, virtual machines, and/or other like computing entities. To this end, the one or more servers of the server stacks 120 may be configured to receive/send communication requests from/to computing entities, as well as correlate the unique IDs of the computing entities with an IP address of the computing entities, and once a communication session is setup, allowing two computing entities to transfer data using a direct communications session.

Figure 2:
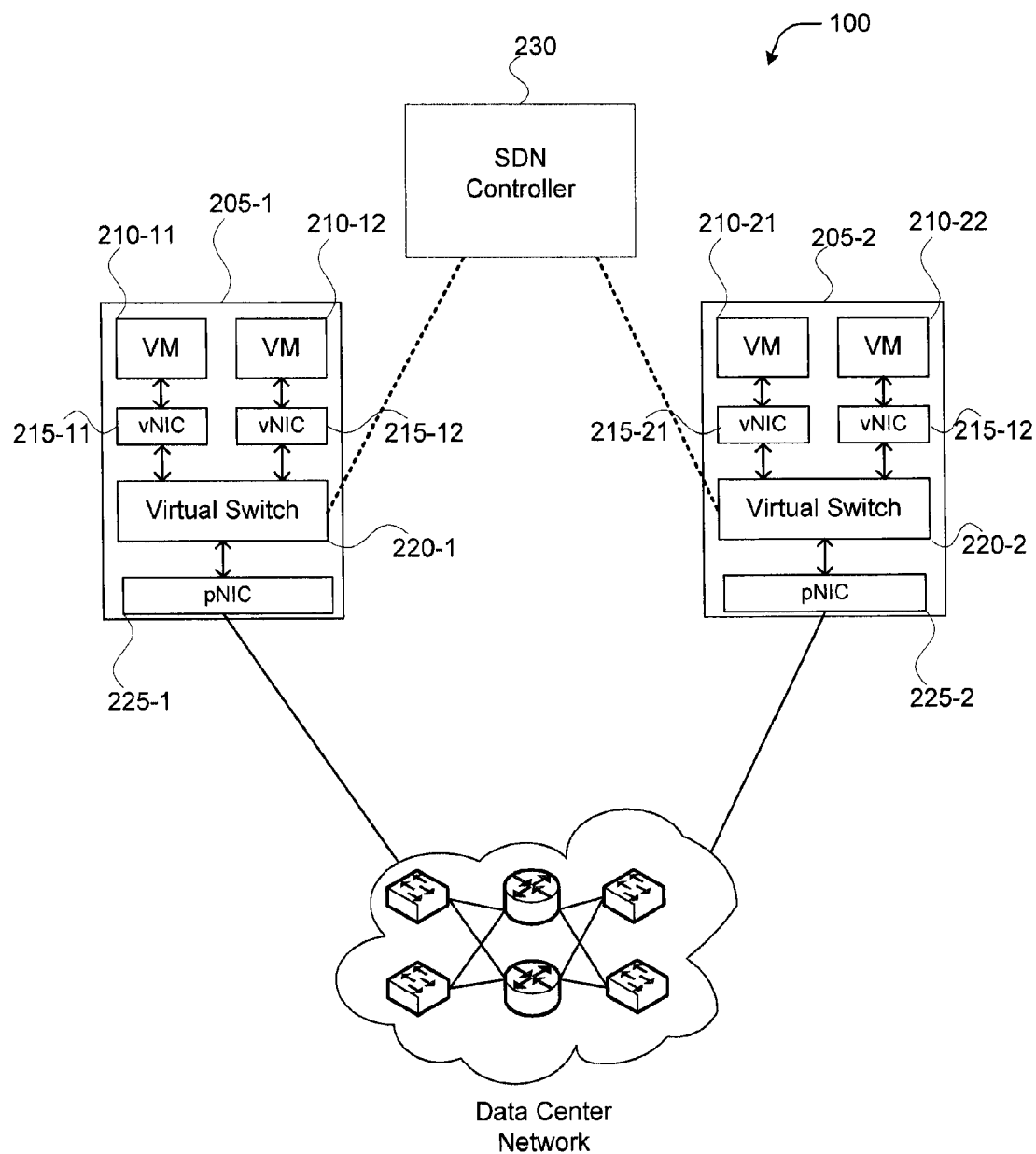
FIG. 2 illustrates the components of network devices being employed by a communications network according to an example embodiment.

FIG. 2 illustrates the components of network devices 205 being employed by the communications network 100, according to an example embodiment. In various embodiments, the network devices 205 may be a server, such as one or more servers of the server stacks 120, or other like computing entities. In various embodiments, the SDN controller 230 may be a network controller that is capable of obtaining data packets associated with one or more data flows, controlling one or more characteristics of data flows (e.g., alter the data flow's path, adjusting the bandwidth allocated data flows, and the like), collecting statistics and/or other like information about data flows, and the like. In most embodiments, the SDN controller 230 resides on any one of the switches (e.g., edge switches 115, aggregation switches 110, and/or core switch 105). However, in alternate embodiments, the SDN controller 230 may reside on separate physical computing device (not shown).

As shown, network devices 205 include virtual machines (VMs) 210-11, 210-12, 210-21, and 210-22 ("the VMs 210"); virtual network interface cards (vNICs) 215-11, 215-12, 215-21, and 215-22 ("the vNICs 215"); virtual switches (VSs) 220-1, 220-2 ("the VSs 220"); and physical network interface cards (pNICs) 225-11, 225-12, 225-21, and 225-22 ("the pNICS 225"). During operation, the network devices 205 may communicate with SDN controller 230 and/or one or more of the switches of communications network 100. In various embodiments, the network devices 205 may include many more components than those shown in FIG. 2. However, it is not necessary that all of these generally conventional components be shown in order to disclose the illustrative embodiments.

It should be noted that, although not shown, network devices 205 may include one or more processors and one or more memory devices. The memory devices may be computer readable storage media that generally includes a random access memory (RAM), read only memory (ROM), and a permanent mass storage device, such as a disk drive. The memory may also store an operating system and/or program code. The one or more processors may be configured to carry out instructions of the operating system and/or program code by performing the basic arithmetical, logical, and input/output operations of the system. Instructions may be provided to the one or more processors by the memory, or via the pNIC and/or vNIC.

The VMs 210 may be any software implementation and/or emulation of a computing environment that executes programs and/or applications like a physical computing device that is being emulated. The VMs 210 may request processor and/or memory resources via a virtualization layer (not shown), which translates requests to the underlying physical hardware. The virtualization layer may include a hypervisor, VMM, and/or other like virtualization platform that runs on top of an operating system of the network devices 205.

The vNICs 215 may be any software implementation and/or emulation of a network interface card, such that the vNICs 215 may function as conventional network interface cards. The vNICs 215 may be designed to operate with one or more operating systems, hypervisors, VMMs, and/or other like applications. The vNICs 215 connects the VMs 210 to a computer network (e.g., communications network 100) via a virtualized wired or virtualized wireless connection.

The VSs 220 may be any software implementation and/or emulation of a computing device that allows one or more VMs (e.g., VMs 210) to communicate with each other by monitoring and forwarding one or more data packets from one virtual machine to another. In various embodiments, the VSs 220 allow the VMs 210 to communicate with one another using the same or similar communications protocols that would be used over one or more physical switches, without the need for additional networking hardware. The VSs 220 may enable communication between one or more virtual machines residing on the same physical device (e.g., between VM 210-12 and VM 210-11) and/or between one or more virtual machines residing on different physical devices (e.g., between VM 210-12 and VM 210-21).

The pNICS 225 are physical computer hardware components that connect the network devices 205 to a computer network via a wired or wireless connection. In embodiments utilizing a wireless connection, the pNICs 225 may operate in conjunction with a wireless transmitter/receiver and/or transceiver (not shown) that is configured to operate in accordance with the IEEE 802.11-2007 standard (802.11), the Bluetooth standard, and/or any other like wireless standards. In embodiments utilizing a wired connection, pNICs 225 may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols).

During operation, a VM 210 may transmit data to a corresponding VS 220 via a corresponding vNIC 215, where the VS 220 is managed by the SDN controller 230. Each VM 210 communicates with an underlying VS 220 through its vNIC 215. The VS 220 forwards data packets to the data center network through the pNIC 225. A hypervisor and/or VMM (not shown) converts commands and/or operations issued by the VMs 210 into a format suitable for the underlying physical hardware, and controls and manages the physical resources of the physical machine for each VM 210. The VSs 220 may convert data packets and/or data flows being sent by the VMs 210 into a format suitable for a corresponding pNIC 225.

For example, VM 210-12 may communicate with VM 210-21 by transmitting data packets to VS 220-1 via vNIC 215-12. VS 220-1 converts and forwards the data packets to pNIC 225-1, which then forwards the data packets to pNIC 225-2 through the communications network 100. Once received, the data packets are forwarded from the pNIC 225-2 to VS 220-2, which then converts the data packets into a suitable format for VM 210-21, if necessary. The converted data packets are then transmitted to VM 210-21 via vNIC 215-21.

By way of another example, VM 210-12 may communicate with VM 210-11 by transmitting data packets to VS 220-1 via vNIC 215-12. Because VM 210-12 and VM 210-11 reside on the same physical device, VS 220-1 converts the data packets into a format suitable for VM 210-11, and forwards the data packets to VM 210-11 via vNIC 215-11.

It should be noted that, in both of the aforementioned examples, the data packets may be associated with a data flow and/or data stream. In both of the aforementioned examples, the SDN controller 230 may manage the allocation of physical resources for each data flow based on a packet type of a given data flow and a round-trip delay time (RTD), a round-trip time (RTT), a timeout event, or other like transmission timing of the data packets associated with a data flow.

In many data communications networks (e.g., communications network 100), network congestion may occur at the physical network switches. Generally, physical network switches consist of multiple input and output ports, where each port is shared by multiple data flows. The output-port (hereinafter, "port") is where network congestion in data centers mainly occurs. Therefore, example embodiments provide for congestion management and/or congestion avoidance schemes for (i) edge switches (e.g., edge switches 115) and (ii) Aggregation/Core switches (e.g., aggregation switches 110 and core switch 105). To this end, the SDN controller 230 may be configured to monitor the ports of the VSs 220, detect and/or identify which ports are being used for transmitting data flows, and control the VSs 220 to allocate more or less resources to the data flows based on the characteristics and/or timing of the data flows. In various embodiments, the VSs 220 may monitor their own ports and may send information about data flows traversing their ports to the SDN controller 230.

Figure 3:
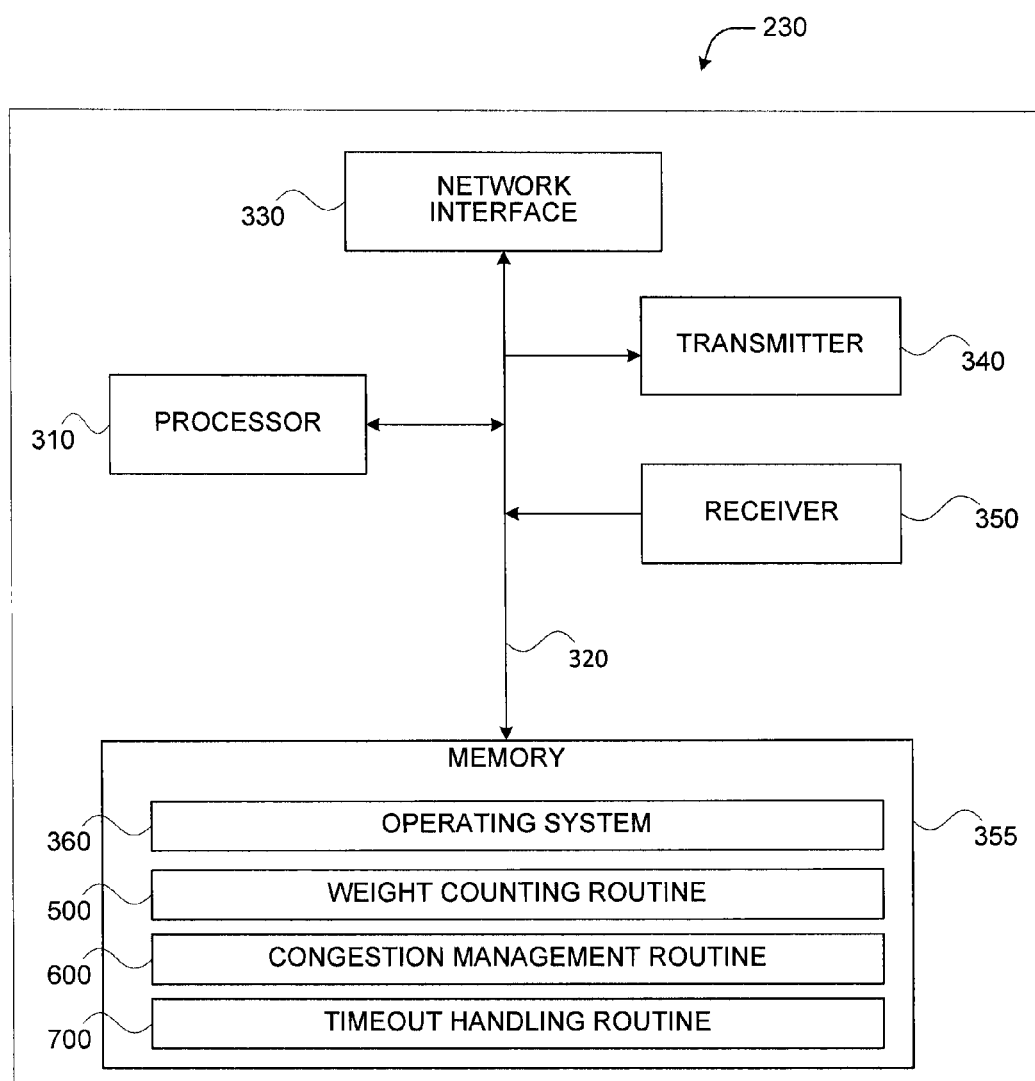
FIG. 3 illustrates the components of a network controller being employed by a data center communications network according to an example embodiment.

FIG. 3 illustrates the components of SDN controller 230 being employed by the communications network 100, according to an example embodiment. It should be noted that any one of the network devices as shown in FIG. 1 (e.g., edge switches 115, aggregation switches 110, and core switch 105) may include the SDN controller 230, and the switches may have a similar configuration of components as shown in FIG. 2. As shown, SDN controller 230 includes processor 310, bus 320, network interface 330, transmitter 340, receiver 350, and memory 355. During operation, memory 355 includes operating system 360, weight counting routine 500, congestion management routine 600, and timeout handling routine 700. In some embodiments, SDN controller 230 may include many more components than those shown in FIG. 3. However, it is not necessary that all of these generally conventional components be shown in order to disclose the illustrative embodiment.

Memory 355 may be a computer readable storage medium that generally includes a random access memory (RAM), read only memory (ROM), and a permanent mass storage device, such as a disk drive. Memory 355 also stores operating system 360 and program code for weight counting routine 500, congestion management routine 600, and timeout handling routine 700. These software components may also be loaded from a separate computer readable storage medium into memory 355 using a drive mechanism (not shown). Such separate computer readable storage medium may include a floppy drive, disc, tape, DVD/CD-ROM drive, memory card, or other like computer readable storage medium (not shown). In some embodiments, software components may be loaded into memory 355 via network interface 330, rather than via a computer readable storage medium.

Processor 310 may be configured to carry out instructions of a computer program by performing the basic arithmetical, logical, and input/output operations of the system. Instructions may be provided to processor 310 by memory 355 via bus 320.

Bus 320 enables the communication and data transfer between the components of SDN controller 230. Bus 320 may comprise a high-speed serial bus, parallel bus, storage area network (SAN), and/or other suitable communication technology.

Network interface 330 is a computer hardware component that connects SDN controller 230 to a computer network via a wired or wireless connection.

Transmitter 340 may be any type of hardware device that may generate, or otherwise produce, radio waves in order to communicate with one or more other devices. Transmitter 340 may be coupled with an antenna (not shown) in order to transmit data to one or more other devices. Transmitter 340 may be configured to receive digital data from one or more components of BPS 120 via bus 220, and convert the received digital data into an analog signal for transmission over an air interface.

Receiver 350 may be any type of hardware device that can receive and convert a signal from a modulated radio wave into usable information, such as digital data. Receiver 350 may be coupled with an antenna (not shown) in order to capture radio waves. Receiver 350 may be configured to send digital data converted from a captured radio wave from one or more other network elements (e.g., one or more servers of the server stacks 120, edge switches 115, aggregation switches 110, and core switch 105) to one or more other component via bus 220. In various embodiments, a transceiver (not shown) may be included with SDN controller 230. A transceiver may be a single component configured to provide the functionality of transmitter 340 and receiver 350 as discussed above.

Figure 4:
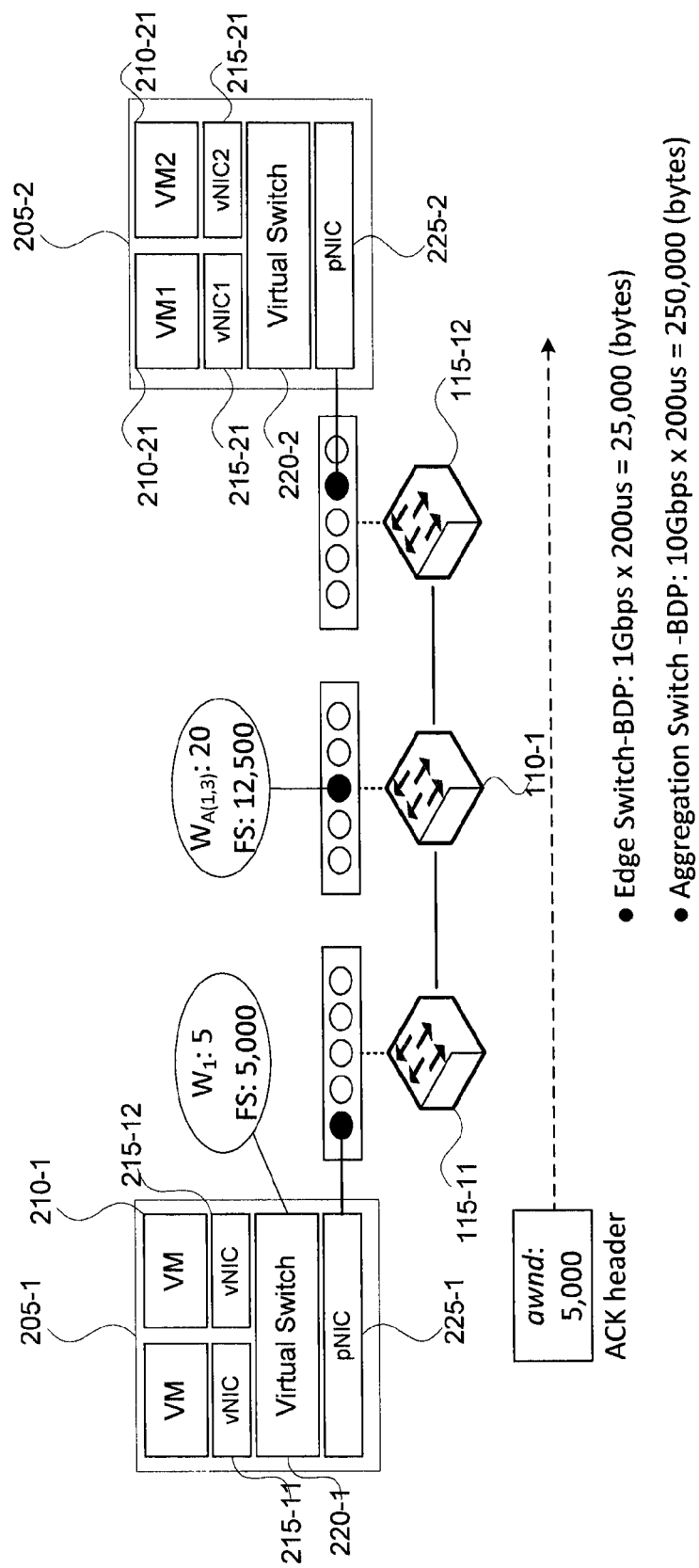
FIG. 4 illustrates an operation diagram for operating SDN-based congestion management, according to an example embodiment.

FIG. 4 illustrates an operation diagram for operating SDN-based congestion management, according to an example embodiment. In the example illustrated by FIG. 4, it is assumed that communication occurs between VM 210-21 and VM 210-12 in communications network 100, via edge switch 115-11, aggregation switch 110-1, and edge switch 115-12. In the example embodiment illustrated by FIG. 4, it is assumed that the uplink capacity for the edge switches is 1 Gbps and the uplink capacity for aggregate and/or core switches is 10 Gbps.

According to various embodiments, congestion management and/or congestion avoidance schemes may operate differently for edge switches (e.g., edge switches 115) and aggregation/core switches (e.g., aggregation switches 110 and core switch 105).

In order to manage network congestion at each edge switch 115, the SDN controller 230 monitors all data flows that traverse each port of each edge switch 115. Because each server is directly connected to each port of edge switch 105 through a corresponding pNIC 225, the SDN controller 230 may keep track of each data flow that traverses each port of each edge switch 115. In various embodiments, the SDN controller 230 may monitor each port of each VS 220 in order to obtain data flow information. In such embodiments, the SDN controller 230 obtains or otherwise determines data flow information for data flows that traverse each port of each edge switch 115. Additionally, in such embodiments the SDN controller 230 computes, calculates, or otherwise determines a fair-share bandwidth allocation and/or weighted fair-share bandwidth allocation for each data flow. The fair-share bandwidth allocation is a proportional allocation of a total bandwidth, such that each port of an edge switch is allocated a proportional amount of bandwidth. The weighted fair-share bandwidth allocation is a proportional allocation of a total bandwidth, such that each port of an edge switch is allocated a proportional amount of bandwidth based on a weight value associated with data flows traversing each port. The weight values may be based on a QoS required for a data flow, a premium status and/or priority status associated with a data flow, a round trip time (RTT) and/or delay associated with a data flow, and the like. The fair-share and/or weighted fair-share bandwidth allocations are determined in order to limit a total utilization of each edge switch 115 according to a bandwidth-delay product (BDP) of each data flow. The BDP is the product of a data link's capacity (in bits per second) and its end-to-end delay and/or RTT.

Once the SDN controller 230 determines the bandwidth allocation for each edge switch 115, the SDN controller 230 sends fair-share information to a corresponding edge switch 115. In various embodiments, the SDN controller 230 sends the fair-share information to each edge switch 115 by utilizing and modifying an advertisement window field in a TCP header. Thus, in order to avoid or otherwise reduce network congestion at each port of each edge switch 115, each edge switch 115 may be informed of an appropriate data size and/or an appropriate bandwidth allocation for transmitting data packets of a data flow over a target port based on the RTT of the data packets of the data flow.

In order to manage network congestion at each aggregation switch 110 and/or core switch 105, the SDN controller 230 may obtain data flow information from each aggregation switch in order to determine a network fair-share bandwidth allocation for each port of each aggregation switch 110 and/or each port of core switch 105. The network fair-share bandwidth allocation is a proportional allocation of a total bandwidth, such that each port of an aggregation/core switch is allocated a proportional amount of bandwidth based on a total weight value associated with all data flows traversing each port. The weight values may be based on a QoS required for a data flow, a premium status and/or priority status associated with a data flow, a round trip time (RIM and/or delay associated with a data flow, and the like.

Using the data flow information of each VS 220, the SDN controller 230 may deduce or otherwise determine each port of each VS 220 where a data flow traverses based on the source and/or destination of the data flow. The SDN controller 230 may periodically gather or otherwise obtain the data flow information from each VS 220 in the communications network 100, and sum a number of all the data flows traversing each port of each VS 220. In other words, the SDN controller 230 has a global view for all data flows in the communications network 100. Since the SDN controller 230 has a global view for all data flows, the SDN controller 230 can compute an over-subscription ratio for each port of each VS 220. The over-subscription ratio is transmitted from the SDN controller 230 to the network element when the over-subscription ratio is less than one (1). If the over-subscription ratio is less than one (1), the SDN controller 230 reports over-subscription related information to the corresponding VS 220 so that each aggregation/core switch can determine a fair-share bandwidth allocation for each data flow. The fair-share bandwidth allocation determined by each aggregation/core switch is based on a network fair-share bandwidth allocation calculated by the SDN controller 230 and the weighted network fair-share bandwidth allocation.

In various embodiments, to keep track of the total weight of active data flows, the SDN controller 230 creates a local flow table for each VS 220. A flow table is a set of data elements associated with a data flow. The flow table is used to match incoming packets to a particular data flow and to specify the functions that are to be performed on the data packets. The open flow tables include various fields, such as a "match" field comprising of MAC/IP addresses, TCP port, and the like; a "weight" and/or "priority" field; a "timeout" field; a "path" field; a "reported_sum_weight" field; and/or other like fields. In various embodiments, the SDN controller 230 may use data flow initiation packets (e.g., a TCP SYN packet) to detect new data flows and data flow termination packets (e.g., a TCP FIN packet) to detect expired data flows. Whenever a new data flow is created (e.g., when a TCP-SYN packet is received), the SDN controller 230 inserts a new flow entry to the local flow table associated with the VS 220. The SDN controller 230 then increases a total weight value each data flow traversing the VS 220 ($W_i$) by a weight value associated with the data flow traversing a target port ($w_k$). On the other hand, whenever a flow is closed, expired, and/or terminated (e.g., a TCP-FIN packet is received), the SDN controller 230 decreases $W_i$ by $w_k$ and deletes the corresponding flow entry from the local flow table.

In various embodiments, the SDN controller 230 may also decrease $W_i$ by $w_k$ if a timer associated with a data flow entry expires. In such embodiments, the SDN controller 230 may decrease $W_i$ by $w_k$ even if a data flow termination packet is not received. However, when the SDN controller 230 receives a data packet of a data flow that exists in the local flow table, a timer associated with the data flow is refreshed to a desired timeout value. If the timeout value is zero (0), which may indicate that the timer has previously expired, the SDN controller 230 increases $W_i$ by $w_k$ and restores the timeout value to the desired timeout value.

Furthermore, in various embodiments, each data flow may be associated with a priority level. A priority level may be any type of indication by which data flows are given access to network resources, where data flows with a higher priority are given access to, or a preference for, network resources before lower priority data flows. Thus, the SDN controller 230 may allocate a larger share of the bandwidth for a higher priority data flow than a lower priority data flow. A data flow may be assigned or otherwise associated with a priority level based on whether the data flow originates from a trusted domain, a service type of the data flow, an application type associated with the data flow, a source or destination of the data flow, a subscription status associated with a source or destination of the data flow, and/or other like criteria associated with the data flow. The priority levels may be used to influence the weight values assigned or otherwise associated with a data flow.

Referring to FIG. 4, a data flow traverses port 4 of edge switch 115-12, port 3 of aggregation switch 110-1, and port 1 of edge switch 115-11. As discussed above, the uplink capacity for the edge switches is 1 Gbps and the uplink capacity for aggregate and/or core switches is 10 Gbps. When the first packet of the data flow arrives in the VS 220-1 of the network device 205-1, the SDN controller 230 determines a number of data flows that traverse a target port (e.g., port 1) of edge switch 115-11. The SDN controller 230 then determines an uplink capacity (or alternatively, a "link capacity") of edge switch 115-11 and a RTT of the data flows traversing the target port. The BDP can be calculated using equation 1 shown below:

$$BDP = \text{link\_capacity}_i \times RTT \qquad \text{[Equation 1]}$$

In equation 1, link_capacity$_i$ is the link capacity of a target port of an ith pNIC. RTT is the round trip time of at least one data flow traversing a target port of the ith pNIC. In the example embodiment illustrated by FIG. 4, when the first packet of a data flow arrives in the VS 220-1 of the network device 205-1, the SDN controller 230 determines that the port 1 (i.e., the target port) of edge switch 115-11 is shared by five (5) data flows by counting a number of data flows traversing port 1 of edge switch 115-11. For the example embodiment illustrated by FIG. 4, it is assumed that each data flow traversing port 1 of edge switch 115-11 has an equal weight value. Because the link capacity of edge switch 115-11 is 1 Gbps, and assuming a RTT of the data flows traversing port 1 of edge switch 115-11 is 200 µs, the BDP for port 1 of edge switch 115-11 is 25,000 bytes.

The SDN controller 230 then determines a weighted fair-share bandwidth allocation for data flows that traverse the port 1 of edge switch 115-11. The weighted fair-share bandwidth allocation of a data flow is computed using the BDP shown in equation 2:

$$\text{weighted\_fair\_share}_{ki} = \text{BDP} \times (w_k/W_i) \quad \text{[Equation 2]}$$

In equation 2, weight_fair_share$_{ki}$ is the weighted fair-share bandwidth allocation of a data flow k traversing a target port of the ith pNIC. The BDP is calculated using the link capacity of the target port of the ith pNIC and the RTT associated with data packets of the data flow k as shown in equation 1. $W_k$ is a weight value assigned to or otherwise associated with the data flow k and $W_i$ is a total weight value of the ith pNIC. The total weight value $W_i$ is a sum of all the weight values for each of the ports of the ith pNIC.

The bandwidth allocated to the data flow k is weighted by the priorities assigned to the data flow k. In various embodiments, the weight value of the data flow k may be obtained from the "weight" field of a local flow table associated with VS 220-1. It should be noted that, in the instance that each of the data flows are treated equally (i.e., where each $w_k$ has an equal value, such as 1), then $W_i$ will indicate a number of active data flows traversing a virtual switch through the ith pNIC.

Referring back to FIG. 4, the SDN controller 230 determines that the weight value assigned to or otherwise associated with the data flow k is 5 ($W_1$ as shown in FIG. 4). Using equation 2, and because the weights for each data flow traversing port 1 are equal, the weighted fair-share bandwidth allocation for port 1 of edge switch 115-11 is 5,000 bytes.

For the aggregation switch 110-1, the SDN controller 230 computes a network fair-share bandwidth allocation of the data flow k. The network fair-share bandwidth allocation is a weighted fair-share for a target port at a aggregation/core switch. In various embodiments, the aggregation switch 110-1 periodically reports (e.g., every one second) data flow information to the SDN controller 230. The data flow information includes the weight value of the data flow k and the end-to-end path of the data flow k.

Referring to FIG. 4, the data flow traverses port 4 of edge switch 115-12, port 3 of aggregation switch 110-1 (i.e., A(1,3) as shown in FIG. 4), and port 1 of edge switch 115-11. In various embodiments, the data flow information is obtained from the "path" field of a local flow table associated with aggregation switch 110-1. With the data flow information, the SDN controller 230 computes an over-subscription ratio for each port of aggregation switch 110-1.

As discussed above, the over-subscription ratio is a ratio of the bandwidth allocation of a target port to a number of data flows traversing the target port. Over-subscription occurs when a total bandwidth assigned to a target port is greater than a highest possible bandwidth that the target port can be allocated. When a target port is oversubscribed, network congestion is likely to occur.

The over-subscription ratio is expressed as 1:N, where the number N represents (i) a number of network devices that are connected to a target port of an aggregation/core switch, and (ii) a bandwidth allocation for each of the network devices that are connected to the target port of the aggregation/core switch. The number N increases or decreases whenever network devices using the target port of the aggregation/core switch are added or removed.

Referring to FIG. 4, when the first packet of a data flow arrives in the aggregation switch 110-1, aggregation switch 110-1 determines that port 3 of aggregation switch 110-1 is shared by twenty (20) data flows by counting a number of data flows traversing port 3 of aggregation switch 110-1. The aggregation switch 110-1 then sends data flow information to the SDN controller 230, where the data flow information indicates that port 3 of aggregation switch 110-1 is shared by twenty (20) data flows. Since the link capacity of aggregation switch 110-1 is 10 Gbps and the link capacity for edge switch 115-11 is 1 Gbps, the number N for aggregation switch 110-1 increases or decreases by one (1) whenever ten (10) network devices using the port 3 of the aggregation switch 110-1 are added or removed. Since the twenty (20) data flows are traversing port 3 of aggregation switch 110-1 and the link capacity of aggregation switch 110-1 is 10 Gbps, the SDN controller 230 calculates the over-subscription ratio to be 1:2, and thus, the SDN controller 230 determines that aggregation switch 110-1 is over-subscribed.

In various embodiments, the SDN controller 230 stores the over-subscription ratio in the "reported_sum_weight" field of each local flow table that includes a data flow that traverses a target port. In most embodiments, the over-subscription ratio is stored in the "reported_sum_weight" field when the new value for the "reported_sum_weight" field is larger than the existing value in the "reported_sum_weight" field. In this way, a target port experiencing an over-subscription or a "bottleneck" may be determined by obtaining information from the "reported_sum_weight" field of a local flow table.

Once the over-subscription ratio is determined, the SDN controller 230 calculates or otherwise determines the network fair-share bandwidth allocation of a data flow k traversing a target port of the ith pNIC using equations 3 and 4:

$$\text{BDP} = \text{link\_capacity}_{S(m,n)} \times \text{RTT} \quad \text{[equation 3]}$$

$$\text{network\_fair\_share}_{ki} = \text{BDP} \times (w_k/W_{S(m,n)}) \quad \text{[equation 4]}$$

In equation 3, link_capacity$_{S(m,n)}$ is the link capacity of a target port of the S(m,n) switch, where S indicates a switch type (e.g., an "A" for aggregation switch or "C" for core switch), m is a switch number, and n is a port number of the switch. RTT is the round trip time of the data flow k traversing the target port of the switch (i.e., the S(m,n) switch). In the example embodiment illustrated by FIG. 4, when the first packet of a data flow arrives in the aggregation switch 110-1 (i.e., A(1,3) as shown in FIG. 4), aggregation switch 110-1 determines that port 3 of aggregation switch 110-1 is shared by twenty (20) data flows by counting a number of data flows traversing port 3 of aggregation switch 110-1. Because the link capacity of aggregation switch 110-1 is 10 Gbps, and assuming a RTT of the data flows traversing port 3 of aggregation switch 110-1 is 200 µs, the BDP for port 3 of aggregation switch 110-1 is 250,000 bytes.

In equation 4, network_fair_share$_{ki}$ is the network fair-share bandwidth allocation of a data flow k traversing a target port of the ith pNIC is determined by the aggregation switch 110-1. The BDP is calculated using the link capacity of the target port of the S(m,n) switch and the RTT associated with data packets of the data flow k as shown in equation 3. $W_k$ is a weight value assigned to or otherwise associated with the data flow k. $W_{S(m,n)}$ is a total weight value of the S(m,n) switch. The total weight value $W_{S(m,n)}$ is a sum of all the weight values for each of the data flows traversing each of the ports of the S(m,n) switch. As discussed above, the bandwidth allocated to the data flow k is weighted by the priorities assigned to the data flow k, and the weight value of the data flow k may be obtained from the "weight" field of a local flow table.

Referring back to FIG. 4, the SDN controller 230 determines that the weight value assigned to or otherwise associated with the data flow k is 20 ($W_{A(1,3)}$ as shown in FIG. 4). Using equation 4, and assuming that the weights for each data flow traversing port 3 are equal, the network fair-share bandwidth allocation for port 3 of aggregation switch 110-1 is 12,500 bytes.

Once the network fair-share bandwidth allocation is determined, the SDN controller 230 sends the network fair-share bandwidth allocation to a corresponding aggregation/core switch (e.g., aggregation switch 110-1). In some embodiments, the SDN controller 230 sends the network fair-share bandwidth allocation with the over-subscription ratio to the corresponding aggregation/core switch. The network fair-share bandwidth allocation is then used by the aggregation/core switch to adjust a bandwidth allocation of the target port.

Additionally, in various embodiments, an aggregation/core switch may obtain the weighted fair-share bandwidth allocations from each of edge switch, as well as the network fair-share bandwidth allocation from SDN controller 230. In such embodiments, the aggregation/core switch may then determine a fair-share bandwidth allocation for the data flow based on one or both of the weighted fair-share bandwidth allocations and the network fair-share bandwidth allocation. In various embodiments, the aggregation/core switch may adjust a bandwidth allocation for the data flow traversing the target port to be a minimum value between the weighted fair-share bandwidth allocation and the network fair-share bandwidth allocation.

Referring back to FIG. 4, because the data flow traverses port 4 of edge switch 115-12, port 3 of aggregation switch 110-1, and port 1 of edge switch 115-11; the aggregation switch 110-1 obtains the weighted fair-share bandwidth allocations from each of edge switch 115-12 and edge switch 115-11, as well as the network fair-share bandwidth allocation from SDN controller 230. The aggregation switch 110-1 may determine a fair-share bandwidth allocation for the data flow based on the weighted fair-share bandwidth allocations and the network fair-share bandwidth allocation. Because the weighted fair-share value is 5,000 bytes and the network fair-share value is 12,500 bytes, the aggregation switch 110-1 may determine the fair-share bandwidth allocation for the data flow to be the weighted fair-share bandwidth allocation.

Once the fair-share bandwidth allocation is determined, the aggregation/core switch may adjust a current bandwidth allocation for the data flow according to the determined fair-share bandwidth allocation. In various embodiments, an advertisement window value in a TCP header ("awnd" as shown in FIG. 4) may be replaced by the minimum value between the weighted fair-share bandwidth allocation and the network fair-share bandwidth allocation. The advertisement window is used to determine a maximum amount of data that can be sent before a sending entity must wait for an acknowledgement from a receiving entity. Using the advertisement window, the receiving entity may manage data flow control. With the advertisement window value in the TCP header, the receiving entity may continually inform the sending entity of how much data it is prepared to receive. Thus, by altering the advertisement window value in the TCP header, a host and/or virtual machine may be informed about an appropriate data size to transmit to another host and/or virtual machine. Additionally, by altering the advertisement window value in the TCP header, the bandwidth allocation may be adjusted along an entire path of a data flow (i.e., an end-to-end path), such that each node that a data flow traverses may adjust its bandwidth allocation accordingly.

In the example embodiment illustrated by FIG. 4, the weighted fair-share value is 5,000 bytes and the network fair-share value is 12,500 bytes, so the advertising window of the TCP header will be altered to indicate that the bandwidth allocation should be limited to 5,000 bytes.

Figure 5:
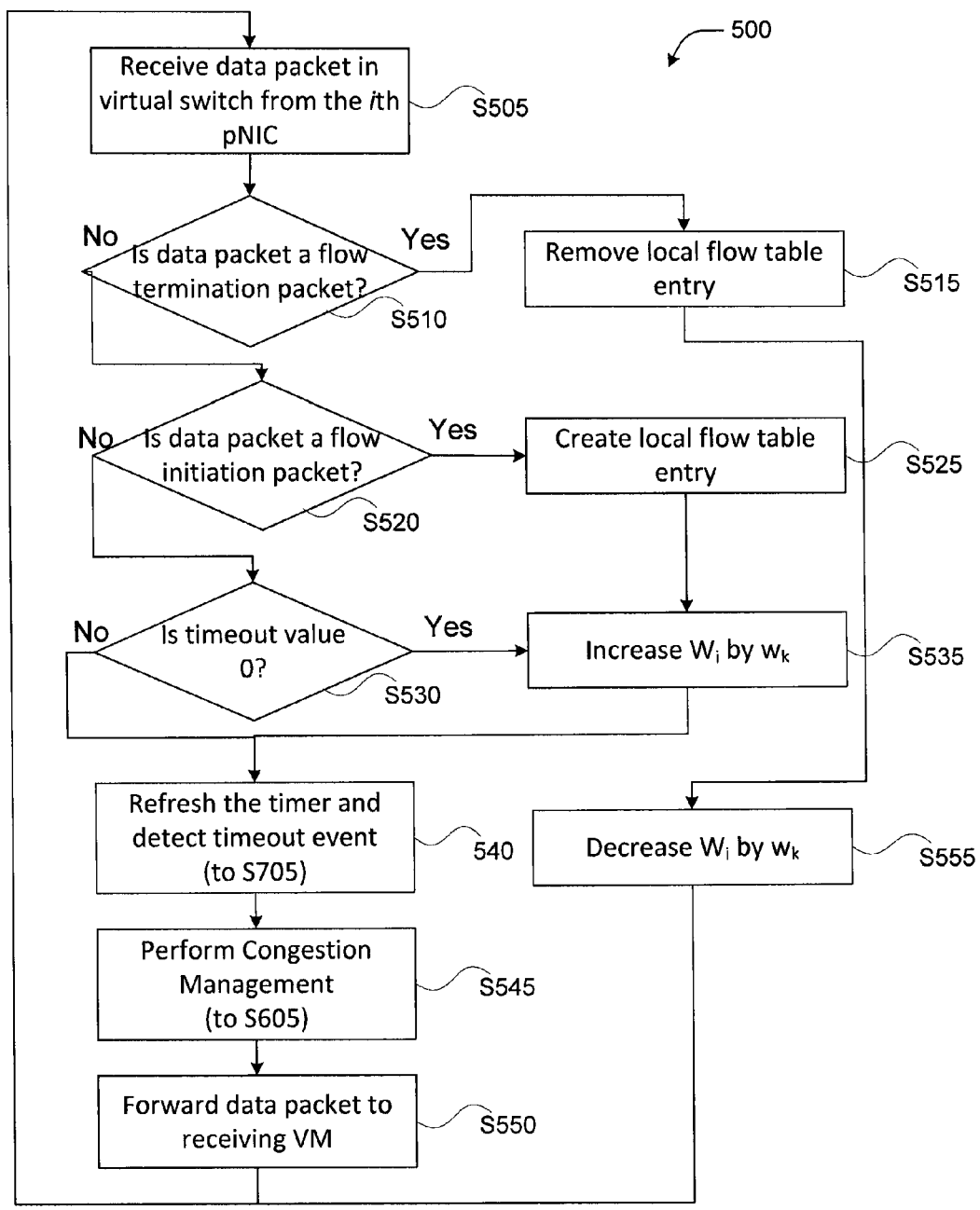
FIG. 5 shows a weight counting routine, according to an example embodiment.

FIG. 5 shows a weight counting routine 500, according to an example embodiment. According to example embodiments, weight counting routine 500 is operated by SDN controller 230 in communications network 100. Weight counting routine 500 may be used to apply and/or adjust a weight value assigned to a target port associated with a data flow. By adjusting the weight value associated with the target port, the bandwidth allocation of the data flow may be adjusted.

As shown in operation S505, SDN controller 230 is informed that a data packet of a data flow is received in the VS 220 from the pNIC 205. According to various embodiments, SDN controller 230 may be able to monitor all ports of each VS 220 (referred to as monitoring globally). In such embodiments, SDN controller 230 may be configured to automatically detect and/or identify which ports are being used for transmitting and/or receiving data flows. In other embodiments, SDN controller 230 receive data flow information from each VS 220 in order to determine and/or identify which ports are being used for transmitting and/or receiving data flows. Thus, in various embodiments, SDN controller 230 tracks packets that arrive in the VS 220 from the pNIC 205 via an output-port of the edge switch 115.

As shown in operation S510, the SDN controller 230 determines if the received data packet is a flow termination packet. In various embodiments, the flow termination packet may be a TCP packet that has a FIN bit set in the TCP header. In such embodiments, the TCP packet with a set FIN bit may serve as a connection termination request.

If in operation S510 the SDN controller 230 determines that the received packet is a flow termination packet, the SDN controller 230 proceeds to operation S515 to remove an entry associated with the data flow from a local flow table of VS 220. After the entry associated with the data flow is removed from the local flow table, the SDN controller 230 proceeds to operation S555 to decrease the total weight value of all the active data flows ($W_i$) by the weight value associated with the data flow traversing the target port ($w_k$).

If in operation S510 the SDN controller 230 determines that the received packet is not a flow termination packet, then the SDN controller 230 proceeds to operation S520 to determine if the received data packet is a flow initiation packet. In various embodiments, the flow initiation packet may be a TCP packet that has a SYN bit set in the TCP header. In such embodiments, the TCP packet with a set SYN bit may serve as a session initiation request.

If in operation S520 the SDN controller 230 determines that the received packet is a flow initiation packet, the SDN controller 230 proceeds to operation S525 to create an entry associated with the data flow in the local flow table of VS 220. A flow table may be a set of data elements that includes information associated with a data flow. The flow table may be used to match incoming data packets to a particular data flow and may specify one or more functions that are to be performed on the data packets. The open flow table may include various fields, such as a "match" field comprising of MAC/IP addresses, TCP port, and the like; a "weight" and/or "priority" field; a "timeout" field; a "path" field; a "reported_sum_weight" field; and/or other like fields.

After the entry associated with the data flow is created in the local flow table, the SDN controller 230 proceeds to operation S535 to increase the total weight value of all the active data flows ($W_t$) by the weight value associated with the given data flow ($w_k$).

If in operation S520 the SDN controller 230 determines that the received packet is not a flow initiation packet, then the SDN controller 230 proceeds to operation S530 to determine if a timeout value associated with the data flow is zero (0). A timeout value may be a parameter that specifies a period of time that is allowed to elapse before a specified event is to take place, unless another specified event occurs first. In various embodiments, a timeout value may be a value of a timer, which indicates that a timeout event has occurred when the timer reaches the timeout value. According to various embodiments, when the timer reaches the timeout value, the SDN controller 230 may determine that the data flow is in an idle state. Conversely, if the timeout value is zero (0), then the SDN controller 230 may determine that the data flow is in a streaming state.

Typically, bandwidth allocated to data flows in an idle state is unused while the data flows remain idle, which may result in wasted bandwidth. Additionally, bursty-type data flows, while not idle, may require less bandwidth than streaming-type data flows. This is because bursty-type data flows and/or idle data flows typically have lower data transmission rates such that the bursty-type data flows and/or idle data flows have longer time periods and/or time intervals between transmitting data packets. Thus, bursty-type data flows and/or idle data flows typically require less bandwidth than streaming-type data flows. By contrast, streaming-type data flows typically have higher data transmission rates such that the streaming-type data flows have shorter time periods and/or time intervals between transmitting data packets. Thus, streaming-type data flows typically require more bandwidth than bursty-type data flows and/or idle data flows. Thus, in order to reduce wasted bandwidth, the SDN controller 230 may reduce a weight value of a data flow in order to allocate bandwidth away from bursty-type data flows and/or idle data flows.

Thus, if in operation S530 the SDN controller 230 determines that the timeout value is zero (0), then the SDN controller 230 proceeds to operation S535 to increase the total weight value of all the active data flows ($W_t$) by the weight value associated with the given data flow ($w_k$). However, if in operation S530 the SDN controller 230 determines that the timeout value is not zero (0), the SDN controller 230 proceeds to operation S540 to refresh the timer value and to detect whether a timeout event has occurred. The detection of a timeout event is described with respect to FIG. 7.

A shown in operation S545, the SDN controller performs congestion management routine 600. The congestion management routine 600 is described with respect to FIG. 6.

As shown in operation S550, the data packet is forwarded to the receiving VM. In various embodiments, a TCP header of the data packet may indicate a destination port, which identifies the port of the receiving pNIC 205. Once the data packet is forwarded to the receiving virtual machine, the SDN controller 230 proceeds back to operation S505 to determine if a data packet of a data flow is received in the VS 220 from the pNIC 205.

Figure 6:
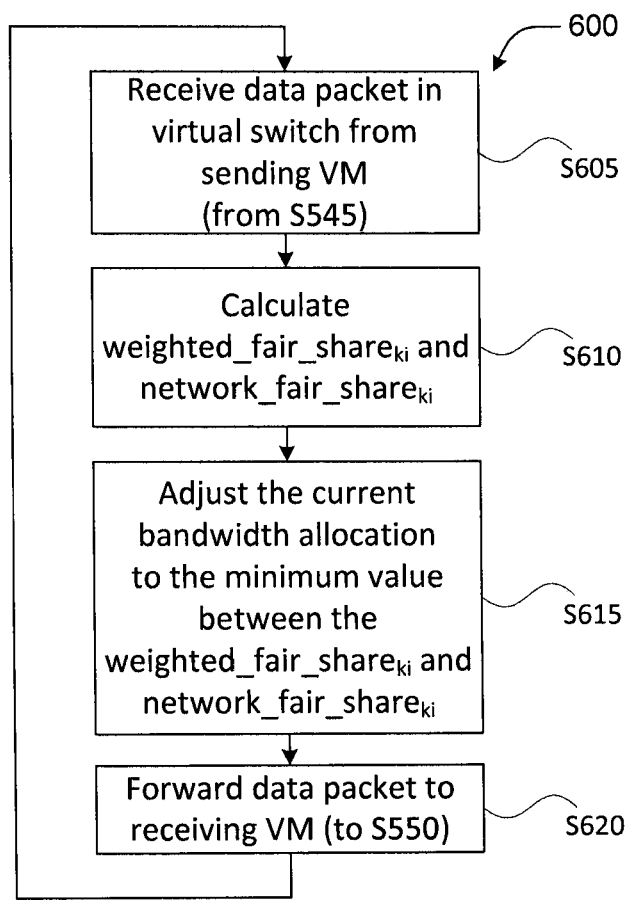
FIG. 6 shows a congestion management routine, according to an example embodiment.

FIG. 6 shows a congestion management routine 600, according to an example embodiment. According to example embodiments, congestion management routine 600 is operated by SDN controller 230 in communications network 100. Congestion management routine 600 is used to adjust the bandwidth allocation for a data flow traversing a target port.

As shown in operation S605, the SDN controller 230 detects that data packet is received in the VS 220 of the receiving VM.

As shown in operation S610 the SDN controller 230 calculates the weighted fair-share value and the network fair-share value. The weighted fair-share value and the network fair-share value are calculated as discussed above with respect to FIG. 4.

As shown in operation S615, the SDN controller 230 adjusts the current bandwidth allocation to a minimum value between the weighted fair-share value and the network fair-share value. In various embodiments, the current bandwidth allocation may be adjusted as discussed above with respect to FIG. 4, for example, by altering or otherwise replacing the advertisement window value in the TCP header with the minimum value between the weighted fair-share bandwidth allocation and the network fair-share bandwidth allocation.

As shown in operation S620, the data packet is sent to the receiving VM.

Figure 7:
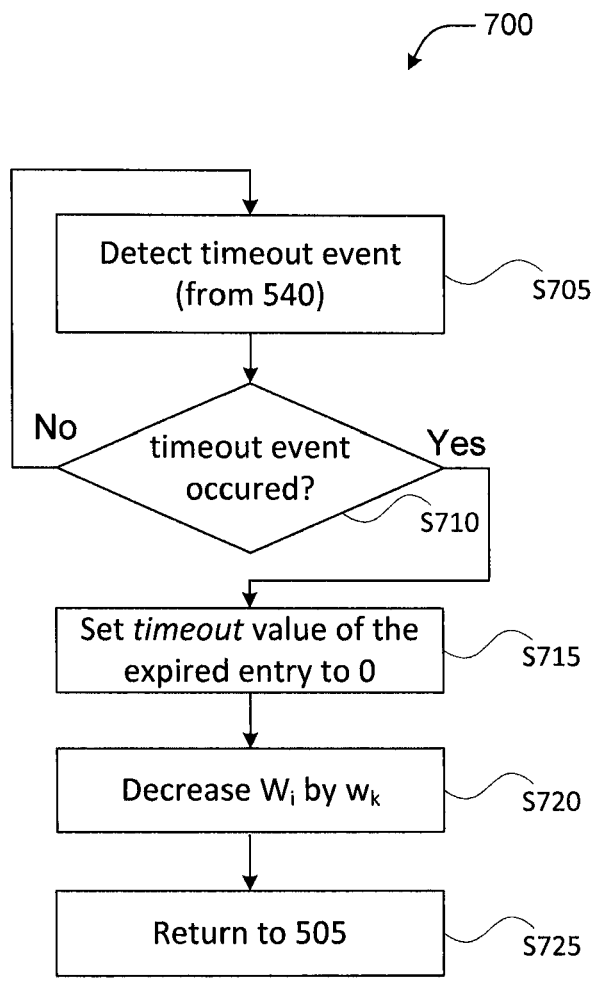
FIG. 7 shows a timeout handling routine, according to an example embodiment.

FIG. 7 shows a timeout handling routine 700, according to an example embodiment. According to example embodiments, timeout handling routine 700 is operated by SDN controller 230 in communications network 100. As discussed above, in various embodiments, the SDN controller 230 may adjust the weight value associated with a given data flow based on a RTT of the data flow's data packets. By adjusting the weight value associated with the data flow based on the timing of the data flow's data packets, the SDN controller 230 may allocate less bandwidth to bursty-type data flows and allocate more bandwidth to streaming-type data flows.

Referring to FIG. 7, as shown in operation S705, the SDN controller 230 is initiated to detect whether a timeout event. As shown in operation S710, the SDN controller 230 determines whether a timeout event has occurred. A timeout event may be any event that occurs at the end of a desired period of time. As discussed above with respect to FIG. 5, a timeout event may include an expiration of a timer associated with a data flow, where the timer is set with a desired timeout value. According to various embodiments, when the timer reaches the timeout value, the SDN controller 230 may determine that the data flow is in an idle state.

It should be noted that if the timeout value is relatively large, the SDN controller 230 may be slow to detect idle data flows. In such instances, bandwidth allocated to those data flows may be unused while the data flows remain in the idle state, thereby resulting in wasted bandwidth. However, if the timeout value is relatively small, the SDN controller 230 may determine that a data flow is in an idle state when it is not actually in an idle state (e.g., a "false alarm" or a "false positive"). In such instances, extra overhead may occur as a result of the SDN controller 230 adjusting the weight values more frequently than necessary.

Therefore, in various embodiments, the timeout value may be dynamically adjusted in order to reduce the chances that bandwidth is allocated to idle data flows and/or to reduce the changes that false positives are detected. The timeout value may be dynamically adjusted between a minimum value $T_{min}$ and a maximum value $T_{max}$. The values $T_{min}$ and $T_{max}$ may be set differently for each virtual switch. In various embodiments, values $T_{min}$ and $T_{max}$ may be any value, however, in many embodiments, $T_{min}$ is set to a value that is larger than a RTT for a data flow traversing the target port.

In various embodiments, the timeout value may be set by the SDN controller 230 based on a timeout fraction. The timeout fraction may be based on a number of times that the total weight ($W_i$) is increased by the weight of the target port ($w_k$) when a subsequent data packet is received after the timeout event occurs. When the total weight is increased after a timeout event occurs (i.e., after the timeout value is refreshed to zero (0)) the data flow may not have been an idle data flow (i.e. a false positive).

The number of false positives may be used to adjust the timeout values $T_{min}$ and $T_{max}$. For example, if a data flow having a RTT of 200 μs is determined to be in an idle state, and the total weight of the switch is increased when a subsequent data packet of the data flow is received after the timeout event occurs, then the SDN controller may increase $T_{max}$ to be greater than or equal to 200 μs.

Referring back to FIG. 7, if at operation S710, the SDN controller determines that a timeout event has not occurred, the SDN controller 230 proceeds to operation S705 to detect a timeout event. However, if at operation S710, the SDN controller determines that a timeout event has occurred, the SDN controller 230 proceeds to operation S715 to set the timeout value of the timer to zero (0). Once the SDN controller 230 sets the timeout value of the timer to zero (0), the SDN controller 230 proceeds to operation S720 to decrease $W_i$ by $w_k$.

After the SDN controller 230 decreases $W_i$ by $w_k$, the SDN controller 230 proceeds to operations 5725 to return to operation S505 of the weight counting routine 500.

As will be appreciated, the method and apparatus according the example embodiments has several advantages. First, example embodiments allow a data center operator to easily manage network congestion that may occur within the data center, which may significantly improve the quality of services of data flows regardless of application-types or traffic patterns. Second, the example embodiments allow for network congestion to be managed without any SDN-enabled switches, but rather the SDN controller of the example embodiments may be employed on a virtual switch that works on a hypervisor of a server. Third, the example embodiments may be implemented in already existing data centers without the need for hardware upgrades.

The invention being thus described, it will be obvious that the same may be varied in many ways. Such variations are not to be regarded as a departure from the invention, and all such modifications are intended to be included within the scope of the present invention.

We claim:

1. A method of adjusting bandwidth allocation by a network switching element in a communications network, the network switching element including a target port, the method comprising:

monitoring, by the network switching element, a data flow traversing the target port of the network switching element;

determining, by the network switching element, a bandwidth allocation for the target port, the bandwidth allocation for the target port being a bandwidth that is currently allocated for the data flow;

determining, by the network switching element, a fair-share bandwidth allocation for the target port, the fair-share bandwidth allocation being a proportional allocation of a total bandwidth of the network switching element; and adjusting, by the network switching element, the bandwidth allocation for the target port based on the fair-share bandwidth allocation.

2. The method of claim 1, wherein the network switching element includes a plurality of ports, the plurality of ports including the target port, and each of the plurality of ports is assigned a corresponding bandwidth allocation, and the determining the fair-share bandwidth allocation comprises:

determining a weight value for each of the plurality of ports of the network switching element;

determining a total weight value based on the weight value of each of plurality of ports; and determining the fair-share bandwidth allocation for the target port based on the weight value of the target port and the total weight value.

3. The method of claim 2, wherein the monitoring comprises:

receiving a data packet associated with the data flow;

determining whether the received data packet is one of a flow termination packet and a flow initiation packet;

increasing the total weight value by the weight of the target port if the received data packet is a flow initiation packet; and decreasing the total weight value by the weight of the target port if the received data packet is a flow termination packet.

4. The method of claim 2, wherein the determining the bandwidth allocation for the target port comprises:

determining a link capacity for the target port, the link capacity being a highest amount of bandwidth that may be allocated to the target port;

determining a round trip time (RTT) associated with the data flow; and determining the bandwidth allocation for the target port by multiplying the link capacity by the RTT.

5. The method of claim 4, wherein the determining the fair-share bandwidth allocation further comprises:

determining a fair-share weight value by dividing the weight value of the target port by the total weight value; and determining a weighted fair-share bandwidth allocation by multiplying the fair-share weight value by the bandwidth allocation for the target port.

6. The method of claim 2, wherein the monitoring comprises:

defining a time out value for a timer, the timer being associated with the bandwidth allocation for the target port; and determining that a timeout event has occurred with respect to the data flow based on expiration of the timer.

7. The method of claim 6, wherein the monitoring further comprises:

receiving a data packet associated with the data flow;

resetting the timer to be equal to the timeout value if the timeout event does not occur before the data packet is received; and decreasing the total weight by the weight of the target port if the timeout event does occur before the data packet is received.

8. The method of claim 7, wherein the monitoring further comprises;

increasing the total weight by the weight of the target port when a subsequent data packet is received after the timeout event occurs.

9. The method of claim 8, wherein the monitoring further comprises:

determining a timeout fraction based on a number of times that the total weight is increased by the weight of the target port when the subsequent data packet is received after the timeout event occurs;

determining a target fraction based on the timeout fraction; and adjusting the timeout value based on the target fraction.

10. The method of claim 6, wherein the timeout value is based on a desired minimum timeout value and a desired maximum timeout value, and the desired minimum timeout value is larger than a round trip time (RTT) associated with the data flow.

11. A method of adjusting bandwidth allocation by a network controller in a communications network, the network controller being configured to control a network switching element, the network switching element including a target port, the method comprising:

receiving, by the network controller, data flow information from the network switching element, the data flow information including information about data flows traversing of the target port of the network switching element;

determining, by the network controller, a bandwidth allocation of the target port based on the data flow information, the bandwidth allocation of the target port being a bandwidth that is currently allocated for each of the data flows traversing the target port;

determining, by the network controller, an over-subscription ratio, the over-subscription ratio being a ratio of the bandwidth allocation of the target port to a number of data flows traversing the target part;

transmitting, by the network controller, the over-subscription ratio to the network switching element based on the over-subscription ratio and a threshold value;

determining, by the network controller, a fair-share bandwidth allocation for the target port based on the over-subscription ratio and the threshold value, the fair-share bandwidth allocation being a proportional allocation of a total bandwidth of the network switching element; and adjusting, by the network controller, the bandwidth allocation for the target port based on the fair-share bandwidth allocation.

12. The method of claim 11, wherein the network switching element includes a plurality of ports, the plurality of parts including the target port, and each of the plurality of ports is assigned a corresponding bandwidth allocation, and the determining the fair-share bandwidth allocation for the target port comprises:

determining the bandwidth allocation for each of the plurality of ports of the network switching element;

determining a weight value for each of the plurality of ports;

determining a total weight value based on the weight value for each of the plurality of ports; and determining the fair-share bandwidth allocation for the target port based on the weight value of the target port and the total weight value.

13. The method of claim 12, wherein the determining the bandwidth allocation for each of the plurality of ports comprises:

determining a link capacity for the target port, the link capacity being a highest amount of bandwidth that is able to be allocated to of the target port;

determining a round trip time (RTT) for one of the data flows traversing the target port; and determining the bandwidth allocation for the target port by multiplying the link capacity by the RTT.

14. The method of claim 13, wherein the determining the fair-share bandwidth allocation for the target port comprises:

determining a fair-share weight value by dividing the weight value of the target port by the total weight value; and determining a network fair-share bandwidth allocation by multiplying the fair-share weight value by the bandwidth allocation of the target port.

15. The method of claim 14, wherein the network switching element is associated with a secondary network switching element, the secondary network switching element including a secondary set of ports, and the secondary network switching element determines a weighted fair-share bandwidth allocation for each of the secondary set of ports.

16. The method of claim 15, wherein the adjusting the bandwidth allocation for the target port comprises:

determining a data flow traversing the target port and a secondary target port, the secondary target port being one of secondary set of ports;

determining the weighted fair-share bandwidth allocation for the data flow traversing the target port and the secondary target port;

determining the network fair-share bandwidth allocation for the data flow traversing the target port and the secondary target port;

adjusting the bandwidth allocation for the target port based on the weighted fair-share bandwidth allocation when the weighted fair-share bandwidth allocation is less than the network fair-share bandwidth allocation; and adjusting the bandwidth allocation for the target port based on the network fair-share bandwidth allocation when the network fair-share bandwidth allocation is less than the weighted fair-share bandwidth allocation.

17. An edge switch for adjusting bandwidth allocation in a communications network, the edge switch including a target port, the edge switch configured to:

monitor a data flow traversing the target port;

determine a bandwidth allocation for the target port, the bandwidth allocation for the target port being a bandwidth that is currently allocated for the data flow;

determine a fair-share bandwidth allocation for the target port, the fair-share bandwidth allocation being a proportional allocation of a total bandwidth of the network switching element; and adjust the bandwidth allocation for the target port based on the fair-share bandwidth allocation.

18. The edge switch of claim 17, wherein the edge switch includes a plurality of ports, the plurality of ports including the target port, and each of the plurality of ports is assigned a corresponding bandwidth allocation, and in the determining the fair-share bandwidth allocation, the edge switch is configured to:
- determine a weight value for each of the plurality of ports of the network switching element;
- determine a total weight value based on the weight value of each of the plurality of ports; and
- determine the fair-share bandwidth allocation based on the weight value for the target port and the total weight value.

19. The edge switch of claim 18, wherein, in the determining the bandwidth allocation for the target port, the edge switch is configured to:
- determine a link capacity for the target port, the link capacity being a highest amount of bandwidth that is able to be allocated to the target port;
- determine a round trip time (RTT) associated with the data flow;
- determine the bandwidth allocation for the target port by multiplying the link capacity by the RTT;
- determine a fair-share weight value by dividing the weight value for the target port by the total weight value; and
- determine a weighted fair-share bandwidth allocation by multiplying the fair-share weight value by the bandwidth allocation for the target port.

20. A Software Defined Networking (SDN) controller for adjusting bandwidth allocation in a communications network, the SDN controller being configured to control an aggregation switch, the aggregation switch including a target port, the SDN controller is configured to:
- receive data flow information from the network switching element, the data flow information including information about data flows traversing of the target port;
- determine a bandwidth allocation of the target port based on the data flow information, the bandwidth allocation of the target port being a bandwidth that is currently allocated for each of the data flows traversing the target port;
- determine an over-subscription ratio, the over-subscription ratio being a ratio of the bandwidth allocation of the target port to a number of data flows traversing the target port; and
- transmit the over-subscription ratio to the aggregation switch based on the over-subscription ratio and a threshold value;
- determine a fair-share bandwidth allocation for the target port based on the over-subscription ratio and the threshold value, the fair-share bandwidth allocation being a proportional allocation of a total bandwidth of the network switching element; and
- adjust the bandwidth allocation for the target port based on the fair-share bandwidth allocation.

* * * * *